(12) United States Patent
Toews

(10) Patent No.: US 10,662,081 B2
(45) Date of Patent: May 26, 2020

(54) SKIM TANK FOR TREATING PRODUCTION FLUIDS

(71) Applicant: GAS LIQUIDS ENGINEERING LTD., Calgary (CA)

(72) Inventor: A. W. (Arnie) Toews, Rocky View (CA)

(73) Assignee: Gas Liquids Engineering, Ltd., Calgary, OT (CA)

( * ) Notice: Subject to any disclaimer, the term of this patent is extended or adjusted under 35 U.S.C. 154(b) by 0 days.

(21) Appl. No.: 15/977,048

(22) Filed: May 11, 2018

(65) Prior Publication Data

US 2019/0345042 A1 Nov. 14, 2019

(51) Int. Cl.
| | | |
|---|---|---|
| *C02F 1/40* | (2006.01) | |
| *B01D 17/02* | (2006.01) | |
| *B01D 17/04* | (2006.01) | |
| *C02F 103/10* | (2006.01) | |
| *C02F 101/32* | (2006.01) | |

(52) U.S. Cl.
CPC ............ *C02F 1/40* (2013.01); *B01D 17/0211* (2013.01); *B01D 17/0214* (2013.01); *B01D 17/045* (2013.01); *C02F 2101/32* (2013.01); *C02F 2103/10* (2013.01)

(58) Field of Classification Search
CPC ............ B01D 17/0211; B01D 17/0214; B01D 17/045; C02F 1/40
USPC ... 210/776, 801, 519, 521, 522, 540, DIG. 5
See application file for complete search history.

(56) References Cited

U.S. PATENT DOCUMENTS

| | | | |
|---|---|---|---|
| 745,519 A * | 12/1903 | Pravicha | B01D 17/0208 210/521 |
| 2,846,073 A | 8/1958 | Hopper | |
| 3,651,944 A * | 3/1972 | Shuttleworth | B01D 17/0211 210/311 |
| 3,844,944 A * | 10/1974 | Mercuri | B01D 17/0211 210/776 |
| 3,862,039 A * | 1/1975 | Summers | B01D 17/0208 210/540 |
| 4,048,069 A | 9/1977 | Cuvillier | |
| 4,123,365 A * | 10/1978 | Middelbeek | B01D 17/0211 210/521 |
| 4,237,004 A | 12/1980 | Helke | |
| 4,308,136 A | 12/1981 | Warne | |
| 4,425,239 A | 1/1984 | Jacocks | |
| 4,555,332 A | 11/1985 | Francis | |
| 4,559,141 A | 12/1985 | Gyulavari | |
| 4,824,580 A * | 4/1989 | Standridge | B01D 17/0211 210/801 |
| 4,844,819 A | 7/1989 | Norman | |

(Continued)

FOREIGN PATENT DOCUMENTS

CN 2838719 11/2006

*Primary Examiner* — Christopher Upton
(74) *Attorney, Agent, or Firm* — Snell & Wilmer L.L.P.; Russell T. Manning

(57) ABSTRACT

Improved apparatus and methodologies for separating production water arising from conventional oil well production operations, the production water containing less than 1% oil-in-water, where the apparatus and methodologies may include the use of a large separation vessel configured to perform a phase separation mid-stream of a continuous fluid flow path, thereby increasing the overall retention time of the separation vessel.

19 Claims, 5 Drawing Sheets

(56) References Cited

U.S. PATENT DOCUMENTS

| | | | | |
|---|---|---|---|---|
| 4,980,070 | A | * | 12/1990 | Lieberman ......... B01D 17/0214 |
| | | | | 210/522 |
| 5,132,010 | A | * | 7/1992 | Ossenkop .......... B01D 17/0214 |
| | | | | 210/522 |
| 5,236,585 | A | | 8/1993 | Fink |
| 5,560,826 | A | | 10/1996 | Szereday |
| 5,795,478 | A | * | 8/1998 | Hirs ................... B01D 17/0214 |
| | | | | 210/521 |
| 5,935,445 | A | * | 8/1999 | Febres ............... B01D 17/0211 |
| | | | | 210/776 |
| 5,989,415 | A | * | 11/1999 | Hirs ................... B01D 17/045 |
| | | | | 210/521 |
| 6,079,571 | A | * | 6/2000 | Stowell ............. B01D 17/0211 |
| | | | | 210/521 |
| 7,927,490 | B2 | * | 4/2011 | Teichroeb .......... B01D 17/0214 |
| | | | | 210/519 |
| 9,334,175 | B2 | | 5/2016 | Bozak |
| 2015/0259231 | A1 | | 9/2015 | Webber |

\* cited by examiner

SKIM TANK FOR TREATING PRODUCTION FLUIDS

CROSS REFERENCE TO RELATED APPLICATIONS

None

FIELD

Embodiments herein relate to improved apparatus and methodologies for separating production water containing an oil-in-water emulsion, the production water stemming from at least one primary separation process following the recovery of oil during oil well production operations. Specifically, the presently improved apparatus and methodologies provide a large, continuous flow separation vessel for removing residual oil particles from pre-treated production water having less than 1% oil-in-water.

BACKGROUND

In oil field production operations, produced fluids are oil and water fluid mixtures that require specialized separation processing. It is desirable to separate the oil from the water so that the oil can be sold and the water can be re-used (e.g., re-injected back into the reservoir to maintain reservoir pressures). It is well known that the water recycled from the production fluid separation processes must be of sufficient quality for re-injection, particularly where the water is mixed with polymers or other chemicals prior to the re-injection.

To date, however, existing separation processes prove ineffective because the produced oil-water mixture is often an emulsion that can be difficult to separate, particularly where the emulsion contains additional production-enhancing chemicals. Known processes also prove troublesome where the produced oil-water mixtures contain sand or other debris (e.g., for production from fracked wells, it is common for 10-15 cubic meters/month of sand to accumulate during separation processes when producing 3000-5000 BPD fluid).

Skim tanks are very large gravity separation vessels that can be used to separate the oil from the water. Oil, having a lower density than water, rises to the surface of the water. During separation, oil droplets coalesce together and float to the top of the surface of the water, where it can be removed. Many attempts have been made over the past half century to improve the efficiency of skim tanks including, for example, configuring tanks to increase the tank's residence or retention time, allowing more time for the oil to rise through the water. Empirical retention time, as opposed to theoretical retention time, is commonly defined as the total amount of time that a molecule of fluid remains in the tank before exiting the tank. Other attempts to improve the efficiency of skim tanks have included modifying the tank to include different piping designs such as horns, nozzles, deflectors and/or accumulators to assist with the separation.

More specifically, some existing tanks have been designed with the aim of providing a longer flow path for the production fluids to travel, such flow path often incorporating coalescing structures to enhance separation. For example, as described in U.S. Pat. No. 4,555,332, tanks have been configured to form a continuous fluid flow channel through coaxially arranged cylindrical chambers formed by baffles within the tank. U.S. Pat. No. 4,844,819 discloses a vertical separation vessel specifically configured to enhance the overall (plastic) surface area of the tank, such that oil, which has an affinity to the plastic, adheres thereto and coalesces into larger globules.

Other known tanks are designed to incorporate modified inlet piping (e.g., conical-shaped inlet diffusers) that cause the fluid flow to achieve greater horizontal width when introduced to the tank, while minimizing vertical divergence (and thus turbulent mixing) of the fluid as it enters the tank.

To date, however, known skim tanks continue to fall short in providing greater than approximately 50% of theoretical retention time at best, which is a result of water short-circuiting to the outlet nozzles and decreasing tank efficacy. As a result, many operators are forced to take additional measures to remove residual oil in the water, e.g., installing filters on the outlet stream, or adding additional tanks to increase overall retention time, such measures increasing the overall costs of the separation process.

There remains a need for an improved system that proves effective at removing residual oil from production water resulting from primary separation processes following oil well production operations, particularly where the resulting production water contains approximately 99% water. It is desirable that such an improved system alters the specific gravity and increases the particle size of the oil phase within the production water, and also provides a sufficient actual (empirical) retention time (e.g., 50% and up to 80% of theoretical retention time) so as to efficiently and effectively perform the separation process.

SUMMARY

According to embodiments herein, an improved system for continuously de-oiling production water emanating from conventional oil field production processes is provided.

Specifically, in some embodiments, methods are provided for separating production water arising from at least one primary separation process following oil well production operations, the production water having at least a water phase and an oil phase between 100 to 10,000 PPM oil-in-water, the method comprising: receiving the production water in at least one gravity separation vessel, wherein receiving the production water comprises introducing the received production water to the first fluid tank along the entire height of the first fluid tank, and then directing fluid flow along a first fluid flow path within the first fluid tank at a flowing velocity of approximately one foot per minute (calculated over the entire cross-sectional area of the water flow path). Once separated, the method comprises recovering the separated oil phase from the at least one first fluid tank and directing the separated water phase, via at least one fluid conduit, to the at least one second fluid tank, wherein receiving the separated water phase comprises introducing the separated water phase to the second fluid tank along the entire height of the second fluid tank, and directing fluid flow along a second fluid flow path within the second fluid tank at a flow rate of approximately one foot per minute. Again, once separated, the method comprises recovering the separated oil phase from the at least one second fluid tank, and recovering the resulting separated water phase from the at least one second fluid tank, wherein the resulting separated water phase contains less than approximately 50 PPM oil-in-water.

According to the present embodiments, the oil phase of the production water received by the present system comprises heavy oil having a specific gravity of at least approximately 0.90-0.95. In some embodiments, the method further comprises injecting lighter oil into the production water to reduce the specific gravity of the heavy oil to at least approximately 0.75-0.85. The present method may further comprise providing a mixer for enhancing the distribution of lighter oil injected into the production water.

According to the present embodiments, the oil phase of the production water received by the present system comprises oil particles averaging approximately 10-40 microns in size. In some embodiments, the method further comprises providing a coalescing medium and exposing the production water to the coalescing medium to increase the average oil particle size to approximately at least 100 microns in size.

According to other embodiments, an apparatus is provided for continuously separating production water containing an oil-in-water emulsion, the production water stemming from at least one primary separation process following oil well production operations, the production water having at least an oil phase and water phase between 100 to 10,000 PPM oil-in-water, the apparatus comprising: at least one first fluid tank having at least one first tank inlet for receiving the production water from the at least one primary separation process, and at least one first tank outlet for expelling the oil phase separated from the water phase in the first fluid tank; at least one second fluid tank in fluid communication with the first fluid tank, the second fluid tank having at least one second tank inlet for receiving the water phase from the at least one first fluid tank, and at least two second tank outlets for expelling the oil phase separated from the water phase and the resulting clean water from the second tank; and at least one fluid conduit providing fluid communication between the first and second fluid tanks, and for directing the water phase from at or near a bottom end of the first fluid tank to the second fluid tank at or near an upper end of the second fluid tank, wherein both the at least one first tank inlet and the at least one fluid conduit are configured to controllably regulate the flow of the production water through the first and second fluid tanks at an average cross-sectional flowing velocity of one foot per minute, respectively. Moreover, the at least one first tank inlet and the at least one fluid conduits are also each configured to introduce the production water along the entire height of the first and second fluid tanks, respectively.

According to other embodiments, the at least one first and second fluid tanks may be substantially cylindrical, and the at least one first fluid tank may be concentrically nested within the at least one second fluid tank. Both the at least one first and second fluid tanks may further comprise at least one impermeable baffle for directing fluid flow along an elaborate fluid flow path. In some embodiments, the apparatus may further comprise at least one coalescing medium, at least one gas injection port, and at least one mixer.

DETAILED DESCRIPTION OF THE EMBODIMENTS

Figure 1:
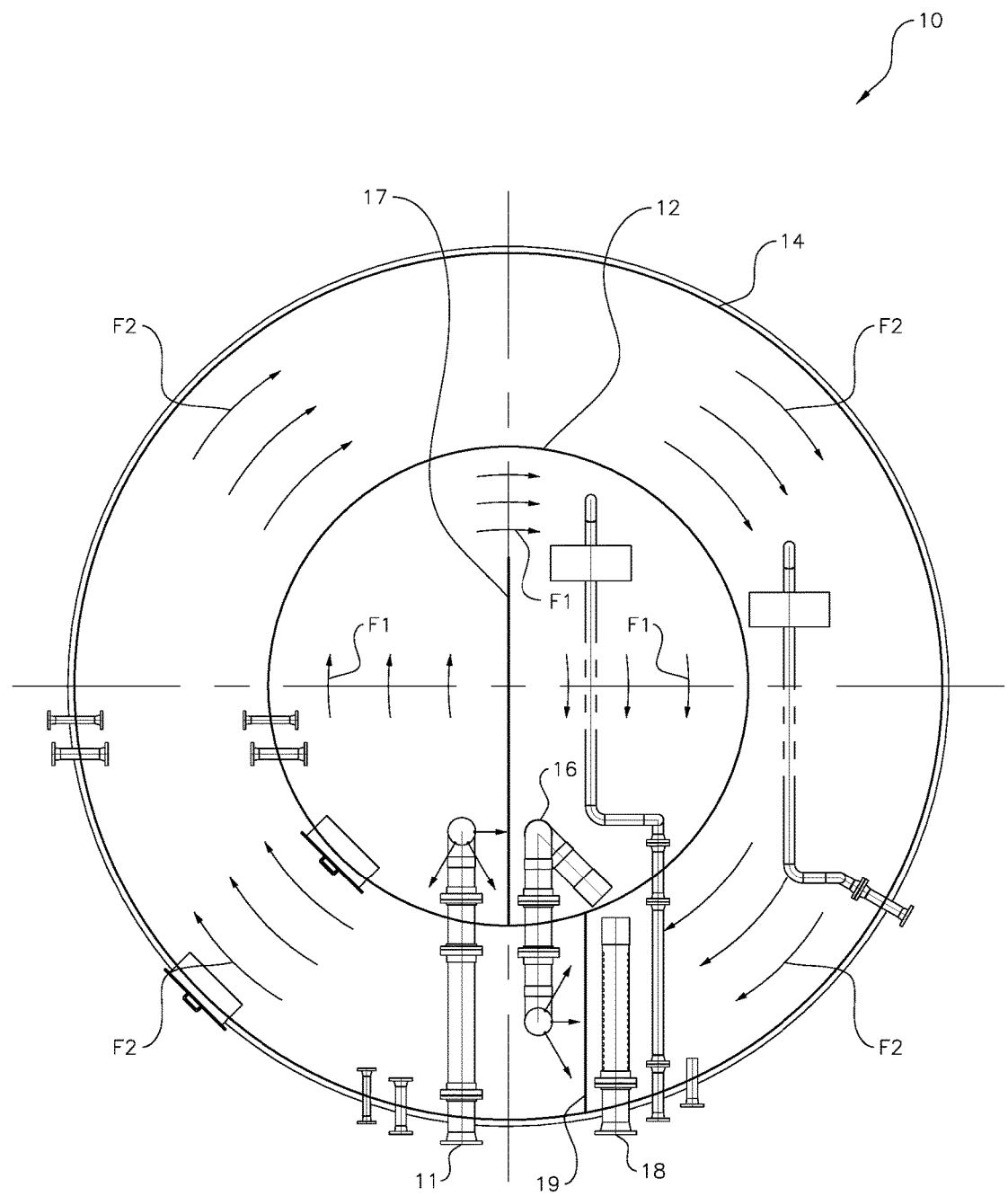
FIG. 1 is a top view schematic of an improved gravity separation system comprising a gravity separation vessel according to embodiments herein.

Following conventional oil and gas recovery operations, pumped effluent recovered at the surface, known as "production fluids", must undergo separation processes to separate the hydrocarbons from the aqueous phase. Generally, primary separation processes produce oil and a water byproduct, the water byproduct often containing residual oil and other contaminants (referred to as "production water"). Production water often contains less than 1% residual oil and generally comprises one of two forms, free water that quickly and easily separates without significant intervention, or emulsified water where the oil-in-water molecules are tightly bound and require further processing. In either case, subsequent separation processes are required in order to remove sufficient residual oil from the production water that it can re-used (e.g., re-injected into the formation).

As would be known, the quality of production water can vary, ranging from a large fraction of hydrocarbons, to barely-perceptible trace amounts. There is a need for effective apparatus and methodologies for treating production water, even where the production water contains only trace amounts of oil (e.g., less than 10,000 PPM of oil, or less than 1% oil in water). For example, it is desirable that such apparatus and methodologies are operative to treat production water such that the resulting fluids, following separation processes, can contain less than 50 PPM of oil in the treated production water.

Many factors can impact the separation of hydrocarbons from production water including, without limitation, the stability or "tightness" of the oil-in-water emulsion, the temperature of the fluids, the primary separation processes that have occurred to generate the production water (e.g., at the oil field battery), etc. Specifically, as will be described in more detail below, the specific gravity of the hydrocarbons compared to the production water and the particle size of the hydrocarbon within the production water, can also impact separation processes. As such, in order to enhance the separation of oil from oil-in-water production water, the present apparatus and methodologies aim to both alter the specific gravity of the oil within the production fluids, and to increase the oil particle size.

Specific Gravity:

The velocity at which oil will rise within the production water is largely dependent upon the differential between the specific gravity of the oil and the water. More specifically, oil having a specific gravity of less than 1.0 will typically rise in production water, which has a specific gravity of approximately 1.03. It has generally been observed that quantities of oil in production water resulting from conventional primary separation processes can be:

for oil having a specific gravity of approximately 0.8-1.0, the production water contains approximately 1,000-10,000 ppm oil in water, for oil having a specific gravity of approximately 0.6-0.8, the production water contains approximately 300-1,000 ppm oil in water.

As such, lighter oil (having a lower specific gravity) will typically separate from production water at a faster rate than heavier oil.

Droplet Size:

The velocity at which the oil will rise in production water is also largely dependent upon the droplet size of the oil in the water (where larger droplets demonstrate increased buoyancy). As such, the rising velocity of oil within produced water can increase considerably with larger oil particle size.

Retention Time:

In addition to increasing the velocity at which the oil separates from the production water, the separation processes can further be enhanced by prolonging the time allotted for the processes to occur. For example, where the separation processes occur in gravity separation vessels, such as skim tanks, a "theoretical retention time" for the tank can be calculated. Herein, "theoretical retention time" means the total volume of fluids contained within the tank, divided by the flow rate of the fluids through the tank (as expressed in minutes or hours). A theoretical retention time can be calculated to determine appropriate settling times for the fluids, wherein the longer the retention time, the more effective the separation processes. Known skim tanks used in the oil field to separate production water typically have a theoretical retention time of approximately forty five (45) minutes to two (2) hours (or any other such time as may be economical).

Unfortunately, the calculated theoretical retention times for separation tanks do not necessarily equate with the "actual or empirical retention times". Herein, "actual retention time" means the actual displaced volume of fluids within the tank over a predetermined amount of time. Actual retention times, which are commonly determined using a tracer dye during operations, are known to be significantly less than the theoretical retention time. For example, the actual retention times for known skim tanks used to separate production water are relatively poor, being anywhere from approximately as low as 5% to as high as 50% of the theoretical retention time. The resulting cleanliness of the fluids exiting known skim tanks is unacceptably low. Where the specific gravity of heavy oil entering the tank is 0.85 or higher, the quantity of oil remaining in the outlet water exiting the tank is often only reduced by approximately 30%-50% ppm compared to inlet water that was introduced to the tank. There is a need for an improved system for enhancing the separation of oil from production water comprising an oil-in-water emulsion, wherein the system is operative to both increase the buoyant velocity of the oil separation and to increase the actual retention time allotted for the separation to occur.

According to embodiments herein, improved apparatus and methodologies for separating the production water resulting from hydrocarbon recovery from oil well production is provided, wherein the production water has undergone at least one primary separation process and comprises an oil-in-water emulsion having between 100 to 10,000 PPM oil in the water. The present apparatus and methodologies aim to enhance the separation processes of pre-separated production water by increasing the rate at which the oil separates from the water (i.e., the aqueous phase), and the actual retention time allotted for the separation to occur. In some embodiments, the present apparatus and methodologies aim to alter both the specific gravity and the particle size of the oil within the production water, and to provide an enhanced fluid flow path for the fluids to travel as they undergo gravity separation. In some embodiments, the present apparatus and methodologies aim to provide for the continuous flow of large amounts of fluids (e.g., up to at least 7,000 $m^3$/d, which is equivalent to at least approximately 291.7 $m^3$/hour or 1,284 GPM). Herein, "fluids" and "production water" may be used interchangeably to refer to the pre-treated production water feed stream introduced into, and treated by, the present apparatus and methodologies. The present apparatus and methodologies will now be described having regard to FIGS. 1-5.

Having regard to FIG. 1, an improved gravity separation vessel 10, referred to interchangeably herein as a vessel or a skim tank, and methods of using same are provided. According to embodiments, the present simple, yet effective, gravity separation vessel 10 is configured to provide an arduous fluid flow path for fluids received therein, minimizing the short circuit of fluid flow from the inlet to the outlet of the vessel 10. Additionally, as will be described, the present gravity separation vessel 10 is configured to alter the specific gravity of components within the fluids (i.e., the oil phase of the oil-in-water emulsion), resulting in lighter components, and to alter the particle size of components in the fluids (i.e., the oil particles within the oil-in-water emulsion), resulting in larger components.

Figure 2:
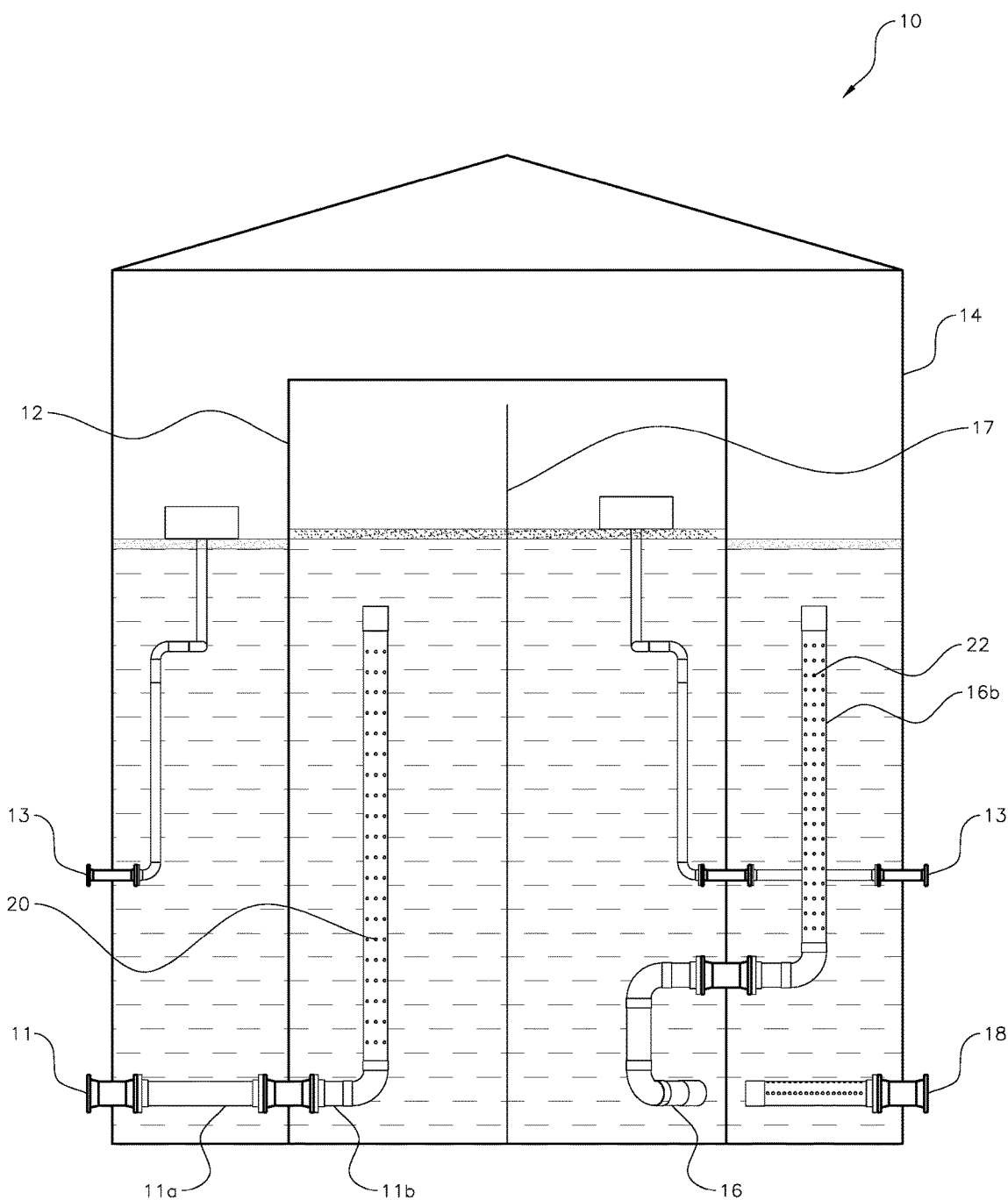
FIG. 2 is a cross-sectional side view schematic of the gravity separation vessel shown in FIG. 1.

Having regard to FIG. 2, in some embodiments, the present separation vessel 10 may comprise at least one (inner) fluid tank 12 concentrically nested within at least one second (outer) fluid tank 14. Although generally cylindrical tanks 12,14 are shown, it should be understood that any shape of tank operative to achieve the present methodologies is contemplated. The presently cylindrical tanks 12,14 each comprise a sidewall, and a bottom wall (i.e., it is contemplated that the tanks may or may not share a common bottom wall). First tank 12 may or may not be open-topped, and second tank 14 comprises a top cover (as shown). It should be understood that vessel 10 may be enclosed via, for example, a gas blanket or any other known means of preventing contaminants from the environment (e.g., oxygen, which can cause bacterial growth) from entering the vessel 10. As will be described, each fluid tank 12,14 may comprise at least one fluid inlet for receiving fluids, and each fluid tank 12,14 may have at least two fluid outlets, for expelling the separated fluid streams from the vessel 10. For example, each tank 12,14 may have at least one first outlet for expelling the oil phase separated out from the production water (e.g., skimmers 13), and at least one second outlet for expelling the cleaned water phase. Separation vessel 10 may further comprise at least one fluid conduit 16 for providing fluid communication between the first and second tanks 12,14. Tanks 12,14 may be large gravity separation vessels wherein, for example, first tank 12 may have a height of at least approximately 22 feet and an inner diameter of at least approximately 12 feet, and second tank 14 may have a height of approximately 26 feet and an inner diameter of at least about 24 feet (e.g., an overall fluid capacity of approximately 2000 bbl, or approximately 300-350 $m^3$).

In some embodiments, each of the first and second tanks 12,14 may be configured to further comprise at least one interior baffle 17,19 (see FIG. 1). Baffle 17 may extend substantially across the cross-section of first fluid tank 12, and may be substantially equal in vertical height to the tank 12. Baffle 17 may be impermeable, such that fluids introduced into tank 12 must follow along a first wide fluid flow path circulating around baffle 17 (arrows F1). As such, in some embodiments, inlet 11 may be positioned in a manner to introduce fluids into tank 12 on a first side of baffle 17, while fluid conduit 16 may be positioned on the opposite side of baffle 17 from inlet 11, such that fluids circulating around baffle 17 exit first tank 12 via fluid conduit 16. It should be appreciated that gravity separation of the production water may continue during and throughout the entire first fluid flow path (F1), such fluid flow path (F1) formed via a wide channel formed within tank 12 (e.g., at least about 5-6 feet in width between the inner periphery of the tank sidewall and the baffle 17, and at least about 16-18 feet high, i.e., achieving a ratio of 3:1 height over width). The wide channels of the present system may be specifically designed so as to decrease the velocity of fluid flow through the channel, minimizing turbulence and provide a quiet flow of fluid through the channel. It should further be appreciated that baffle 17 may be configured and/or positioned in any manner known in the art for directing fluid flow to restrict or minimize short circuiting of fluid flow (F1) through first tank 12.

Baffle 19 may extend entirely across the annulus formed between the inner shell of the tank 14 and the outer shell of tank 12, and may be substantially equal in vertical height to tank 12. Baffle 19 may be impermeable and may impede or delay the flow of fluid around the entire annulus formed between tank 12,14 (arrows F2). As such, in some embodiments, fluid conduit 16 may be positioned in a manner to introduce fluids into tank 14 on a first side of baffle 19, while at least one first outlet 18 in second (outer) tank 14 may be positioned on the opposite side of baffle 19 from conduit 16, such that fluids circulating around the annulus exit via outlet 18 without re-circulating. It should be appreciated that gravity separation of the production water may also continue during and throughout the entire second fluid flow path (F2), such fluid flow path (F2) formed via a wide channel formed within tank 14 (e.g., at least about 5-6 feet in width between the inner periphery of tank 14 and the outer sidewall of the first tank 12 nested therein). It should further be appreciated that baffle 19 may be configured and/or positioned in any manner known in the art for directing fluid flow to restrict or minimize short circuiting of fluid flow (F2) through annulus formed between tanks 12,14.

Figure 3:
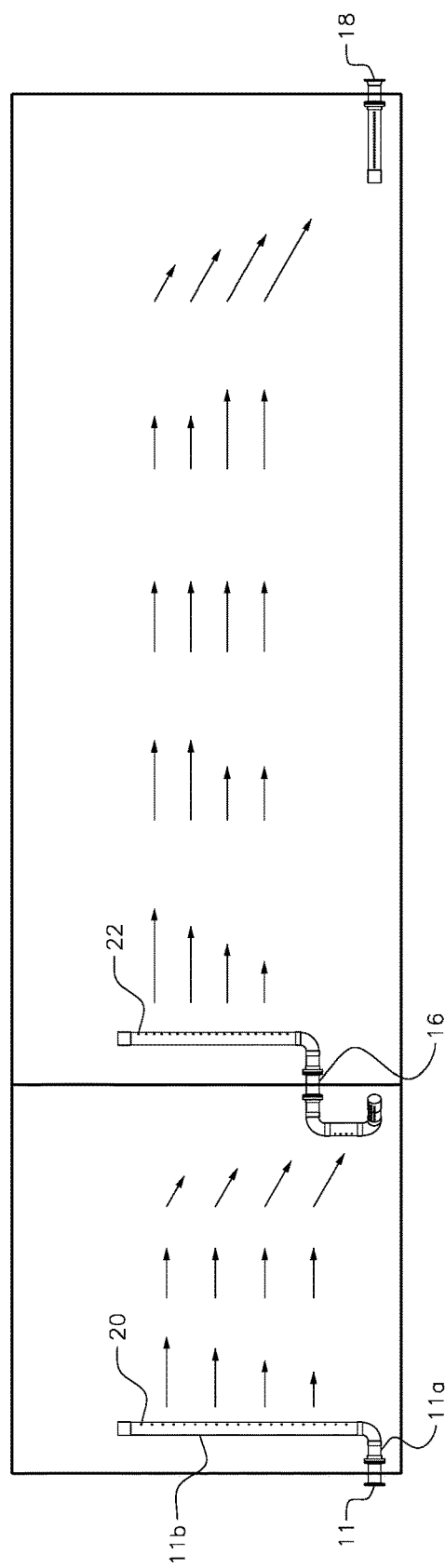
FIG. 3 is a cross-sectional side view schematic depicting fluid flow patterns (F1/F2) within the gravity separation vessel shown in FIG. 1, according to embodiments herein.

Having regard to FIG. 3, fluids may be introduced into first and second tanks 12,14 via inlet pipe 11 (i.e., into first tank 12) and fluid conduit 16 (i.e., from first tank 12 into second tank 14). As above, a production water feed stream containing an oil-in-water emulsion may be introduced into first tank 12, via inlet 11, at a controlled rate, wherein the rate may be based upon the separation processes achieved by the vessel 10. In some embodiments, the production water may be introduced into inlet pipe 11 at a volume of approximately between 100-10,000 m$^3$/day, and preferably in the range of approximately 3500 m$^3$/day to 6500 m$^3$/day.

Inlet pipe 11 may be configured to receive and distribute the production water along the entire height of the tank 12, and particularly in a manner where a larger volume of the fluids are introduced at or near the surface of the fluids (i.e., at or near an upper end of tank 12). As will be described, it is contemplated that a larger volume of the production water introduced into vessel 10 enter tank 12 via an upper end of inlet 11 (i.e., up to at least between 50-100%, and potentially about 70% of the introduced fluids).

Having regard to FIG. 3, in some embodiments, inlet pipe 11 may be configured to pass through the sidewall of both second (outer) tank 14 and first (inner) tank 12 at or near the bottom of the tanks 12,14. Inlet pipe 11 may then be configured to extend upwardly within inner tank 12, and in some cases along the inner surface of the tank's sidewall. In this regard, inlet pipe 11 may comprise a first horizontal pipe section 11a and a second vertical pipe section (riser) 11b, the horizontal and riser sections 11a,11b connected by at least one elbow (fitting) section. Such a configuration causes inlet pipe 11 to form a vertical column for introducing production water into the inner tank 12 substantially near to the surface of the fluids (e.g., at a distance of within approximately 3-4 feet from the surface level). Once introduced into the tank 12, the oil separating from the water phase may rise, due to gravity, to the surface of the fluids within tank 12, and be removed therefrom via outlet 13. Outlet 13 may comprise a skimmer system or other means for removing oil from the surface of water as may be known in the art. It should be appreciated that although the presently configured inlet 11 advantageously disperses the production water into tank 12 in a manner that minimizes the distance the separating oil must travel through the water to reach the surface thereof, any inlet pipe capable of achieving same is contemplated.

Vertical inlet pipe section 11b may be configured to provide a plurality of apertures 20 for controllably distributing the production water into tank 12, ensuring fluid flow (i.e., preventing dead water zones) without creating undue high velocity. Inlet pipe 11 may be configured to provide an internal diameter large enough to provide a very low or negligible friction loss of production water flowing therethrough, such that inlet 11 may serve as a header. In some embodiments, vertical (riser) inlet pipe section 11b may comprise a plurality of holes distributed along its length, wherein more holes are positioned at or near the top of pipe section 11b (e.g., approximately at least 60-1 inch diameter holes), the number of holes decreasing towards the bottom of pipe section 11b. Apertures or holes 20 may be positioned about the periphery of pipe section 11b so as to direct fluid flow into tank 12 (along fluid flow path F1). It would be understood by a person skilled in the art that the size, the shape, the number, and the positioning of the holes formed in the vertical pipe section 11b may be based upon, and determined by, the capacity of the separation vessel 10 and the flow rates/volume of production water being introduced so as to optimize fluid flow and retention rates within the tank 12.

Figure 4:
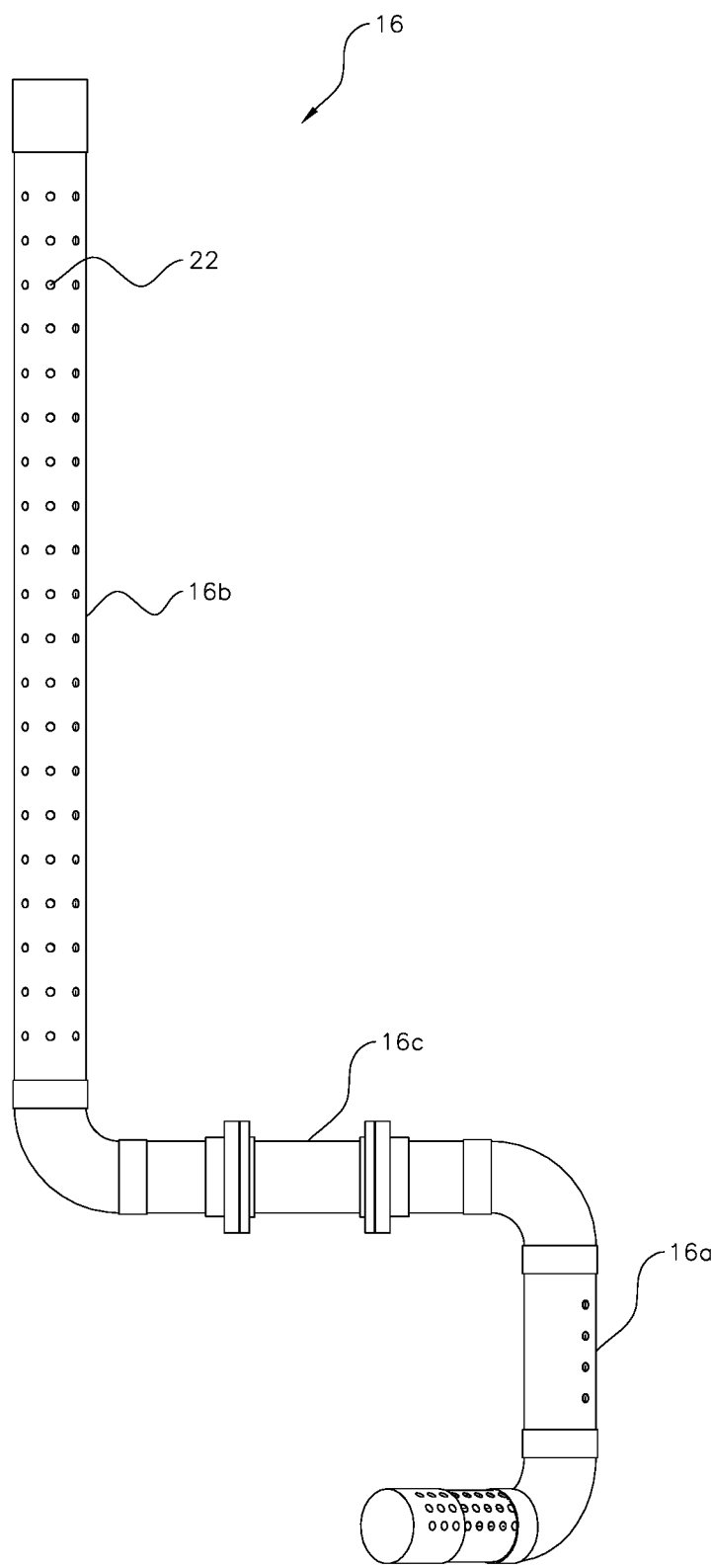
FIG. 4 is a schematic side view of a fluid conduit pipe for transferring fluids between first and second tanks of the gravity separation vessel shown in FIG. 1, according to embodiments herein.

Having regard to FIG. 4, as above, vessel 10 may comprise fluid conduit 16 configured to direct the separated water phase from the first tank 12 to the second tank 14, and specifically to withdraw the clean water phase from the bottom of the first fluid tank 12 and to disperse the water phase into the second fluid tank 14 for further separation. In some embodiments, conduit 16 is configured to transfer the "cleanest" separated water from the lowest point of the first fluid tank 12 (at or near the bottom wall of the tank) to the "least clean" water at or near the surface of the fluids in the second tank 14. In this regard, and similar to inlet 11, conduit 16 is configured to minimize the distance that oil droplets separating from the water phase of the production fluids must travel before being removed from the tank 14. In this further regard, conduit 16 enables the present separation system to perform a phase separation mid-stream of a continuous fluid flow path F1, F2). It should be appreciated that the overall fluid flow from first tank 12 to second tank 14 is continuous, and that the transfer of fluid from first to second tank 12,14 creates an arduous fluid flow path, increasing the overall actual retention time of the fluid within the vessel 10. The apparatus and methodologies described herein are for explanatory purposes only, and it should be appreciated that any vessel configuration operative to achieve the present results is contemplated.

In some embodiments, fluid conduit 16 may be configured to pass through the sidewall of first tank 12 and into second (outer) tank 14 at or near the bottom of tank 14. Conduit 16 may extend upwardly within outer tank 14, and may be positioned at or near the outer periphery of the sidewall of tank 12. Specifically, fluid transfer conduit 16 may comprise a first vertical conduit section 16a and a second vertical conduit section 16b, the two vertical sections connected by at least one horizontal conduit section 16c and corresponding elbow (fitting) sections. In this regard, fluid transfer conduit 16 may form a vertical column for introducing the separated water phase received from first tank 12, into second tank 14 at or near the surface of the fluids within outer tank 14 (e.g., at or near approximately 3-4 feet from the surface level), minimizing the distance oil droplets must rise before being removed from the second tank 14. Similar to the first tank 12, any residual oil in the water phase may rise, due to gravity, to the surface of the fluids within tank 14, and removed therefrom via at least one second outlet 13. Outlet 13 may comprise a skimmer system or any other form of outlet operative to remove separated oil from the surface of water phase, as may be known in the art.

Vertical transfer conduit section 16b may be configured to provide a plurality of apertures 22 for controllably introducing the production water into tank 14, ensuring continued fluid flow (i.e., preventing dead water zones) without creating undue high velocity. In some embodiments, vertical conduit section 16b may comprise a plurality of holes (e.g., approximately at least 60-1 inch holes) distributed along its length, wherein more holes are positioned at or near the top of the conduit section 16b, the number of holes decreasing towards the bottom of conduit section 16b. Apertures 22 may be positioned about the periphery of conduit section 16b so as to direct fluid flow into tank 14 (along fluid flow path F2). It would be understood by a person skilled in the art that the size, the shape, the number, and the positioning of the holes 22 formed in the vertical conduit section 16b may be based upon, and determined by, the capacity of the separation vessel 10 and the flow rates/volume of production water being introduced so as to optimize fluid flow and retention rates within the tank 14.

By way of example, where the flow rate of vessel 10 may be approximately 3500 m$^3$/day, the velocity of production water flowing through each aperture 20,22 of inlet pipe section 11b can be calculated by dividing the total flow by the number of apertures 20 as follows:
 a) Volume of water through each aperture: 3500 m$^3$/day/ 60 holes=58.33 m$^3$/day (or 40.5 L/min)/hole
 b) Velocity (through apertures 20,22)=58.33×35.3×144/ 0.7854×1440×60=4.4 feet/sec
 c) Velocity (average) along flow paths (F1/F2): 3500× 35.3/103.5×1440×60=0.0138 feet/sec
 (Equivalent to 0.83 feet/minute or 94 minutes to completely flow along flow paths F1/F2).

By way of further example, where the flow rate of vessel 10 may be approximately 6500 m$^3$/day, the velocity of production water flowing through each aperture 20,22 of inlet pipe section 11b can be calculated by dividing the total flow by the number of apertures 20 as follows:
 b) Volume of water through each aperture: 6500 m$^3$/day/ 60 holes=108.33 m$^3$/day (or 75 L/min)/hole
 b) Velocity (through apertures 20,22)=108.33×35.3×144/ 0.7854×1440×60=8.1 feet/sec
 c) Velocity (average) along flow paths (F1/F2): 6500× 35.3/103.5×1440×60=0.0257 feet/sec
 (Equivalent to 1.54 feet/min or 51 minutes to completely flow along flow paths F1/F2).

As is known, Stokes Law may be used to determine the settling (or buoyant) velocities of small spherical particles of a different specific gravity in a fluid medium. It would be appreciated that oil entrained in production water can comprise smaller spherical particles (e.g., between 10-40 microns) having a lower specific gravity (e.g., less than 1.0) in order to rise in produced fluids (water) typically having a typical specific gravity of 1.03. According to embodiments herein, the present apparatus may be used alone or in combination with further processing operations, such processing operations aimed at increasing particle size, altering (reducing) the specific gravity of the particles being separated, or a combination thereof.

Figure 5:
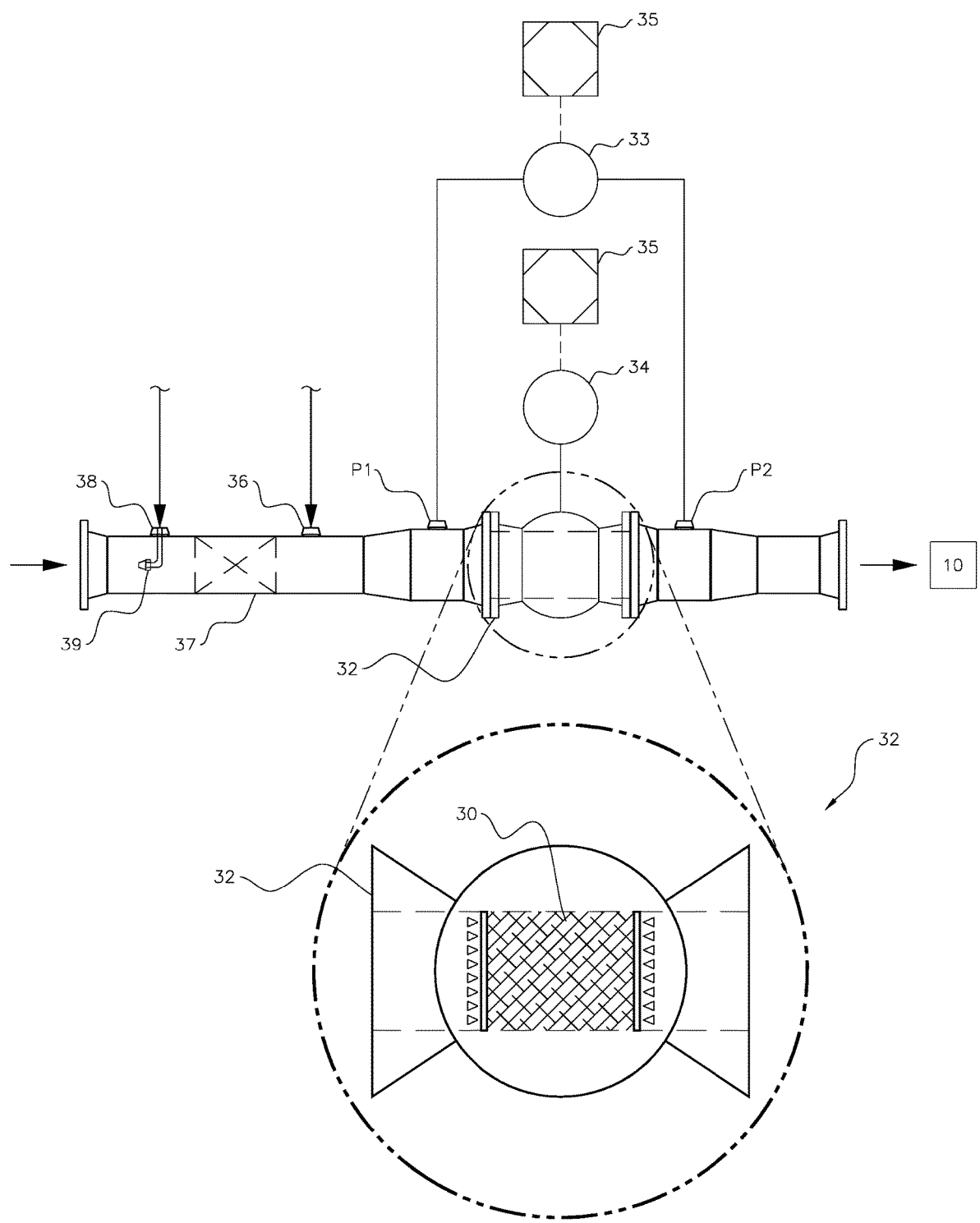
FIG. 5 is a schematic diagram of at least one coalescing medium, and associated componentry, used in combination with the gravity separation vessel showing in FIG. 1, according to embodiments herein.

Having regard to FIG. 5, the present gravity separation vessel 10 may further comprise at least one coalescing medium 30, for adhering with small micron particles of oil within the production fluids (i.e., to increase the particle size of the oil in the oil phase, enhancing separation of the particles from the water phase). In some embodiments, the at least one coalescing medium 30 may be positioned anywhere within vessel 10 and/or within the feed stream of production water being introduced thereto. Coalescing medium 30, e.g., a fiberglass mesh filter material or the like, may be operative to cause smaller particles of oil to adhere to the medium (via the natural oleophilic tendency of oil to bond onto fiberglass), and to coalesce with each other in order to form larger particles as the production water contacts the medium 30 (arrows denote fluid flow). For example, oil particles within the production water fluid stream may be within the range of approximately 10-40 microns, but may increase to be within the range of approximately 100-200 microns upon adhering to the coalescing medium 30. Once the particles have reached a particular size, the oleophilic bond they have to the mesh will be overcome by the water flow, and the coalesced particles will become dislodged from the medium 30 and swept back into the fluid stream (e.g., into the inlet stream entering the separation vessel 10). As such, where applied, the present coalescing medium 30 may be used to increase the size of oil particles within the production water fluid stream (e.g., before entering vessel 10) and thereby enhance their separation from the water as it flows along fluid flow paths F1/F2, or both. It should be understood that the structure of coalescing medium 30 may be sized and assembled in such a fashion so as to enhance the coalescing of small oil particles and discharge them on the downstream side of the medium as larger particles.

In some embodiments, the present at least one coalescing medium 30 may be configured to collect and adhere oil particles where the production water flows past the medium 30 at relatively low rates (e.g., less than 2 feet per second), and where a low differential pressure exists under normal design flow rates. In some embodiments, the medium 30 may have a center portion comprised of a woven fiberglass mesh, or the like, to provide a vast number of individual oleophilic strands for capturing the 10-40 micron-sized oil particles. On either side of the fiberglass mesh, known wedge wire mesh screens may be positioned and specifically designed to block the entrance of large sand/debris from entering the medium 30 and plugging medium 30. The design of the wedge wire screen only allows very small particles of debris to pass through it, thus reducing the risk of plugging the fiberglass mesh. Any small particles that do get through the inlet screen will be able to pass through the fiberglass mesh and be swept out of the downstream screen. Each mesh screen is mechanically supported within valve 32 and capable of withstanding the designed pressure drop should full blockage occur on the wedge wire screens. The differential pressure across medium 30 may, at any time, be increased due to unwanted debris (e.g., sand, grit, sludge or fibrous fragments) clogging or caking up on the inlet screen of medium 30. Where the differential pressure across the coalescing medium 30 increases to a predetermined threshold, the coalescing medium 30 may be configured to "selfclean", releasing any debris that may have caked up on the inlet of the coalescing medium 30 by reversing the coalescing medium within the valve and thereby reversing the flow of the production water through the medium 30. For example, the at least one coalescing member 30 may be positioned within a valve 32, such as within the ball of a ball valve, and the rate of fluid flow across the medium 30 may be monitored and controlled. In some embodiments, the mesh portion of medium 30 may be configured to be positioned inside the ball valve 32, thereby optimizing the velocity inside the mesh, such that the water sweeps off oil particles from the fiberglass strands once the particles reach the sufficient size. Where the differential pressure (measured, for example, via a differential pressure transmitter 33 operatively connected to record signals from pressure sensors located up- and down-stream of valve 32, referred to as $P_1, P_2$, respectively) reaches a maximum threshold, a motor 34 may be activated to rotate valve 32 at least 180 degrees, causing the caked up debris that was formed on the inlet side of medium 30 to now be turned 180 degrees and released from the outlet (downstream) of 30. Each of the differential pressure transmitter 33 and motor 34 may be automated and controlled via a programmable logic controller (PLC) 35.

Having further regard to FIG. 5, the present vessel 10 may optionally comprise a gas port 36, e.g., a gas injection (blast) port, operatively connected to the feed stream of production water for introducing gas into the stream. In some embodiments, the gas port 36 may be upstream of the at least one coalescing medium 30, such that the injected gas may serve to assist in cleaning the medium of caked debris adhered thereto. Gas port 36 may be used to create turbulence within the production water in a manner to de-cake debris from the medium 30. Gas port 36 may be used as desired, or so as to inject gas into the production water at the time, or immediately after, the at least one medium 30 has been rotated by motor 34. In some embodiments, the blast port 36 may be automatically controlled, and may inject gas for a short duration of time, such as less than 5 second and preferably between 1-3 seconds. Gas injected for 1-3 seconds into port 36 may be adjusted in rate so as to create sufficient turbulence across medium 30 to remove all caked up debris that has now been rotated to the downstream side of medium 30. Debris can then flow along with the production water feed stream for separation therefrom within vessel 10.

In some embodiments, the production water feed stream introduced into the present vessel 10 may comprise heavy oil, or oil having a specific gravity of approximately 0.95 or greater. It has been observed that lighter oil having a specific gravity of approximately 0.8-0.85 or less rises up to 18 times faster than heavier oil (where the production water has a specific gravity of 1.03). As such, in some embodiments, the present vessel 10 may optionally further comprise at least one injection port 38, for injecting, where desired, lighter oil particles having lower specific gravity than the heavy oil in the feed stream (e.g., lighter hydrocarbons having a specific gravity of approximately 0.6-0.8) into the production water feed stream. Injection of oil having lower specific gravity via injection port 38 may be dispersed via, for example, nozzle 39. In some embodiments, nozzle 39 may be sized to atomize the lower specific gravity oil into smaller particles (e.g., particles having a size of at least approximately 40 microns). Accordingly, in some embodiments, the oil phase of the production water introduced into the present system 10 may comprise heavy oil having an initial specific gravity of at least approximately 0.90-0.95. In other embodiments, and where lighter oil is injected into the production water to reduce or alter the specific gravity of the heavy oil, the oil phase of the production water introduced into the present system 10 may comprise a specific gravity of approximately 0.75-0.85.

Having further regard to FIG. 5, in some embodiments, the present vessel 10 may optionally further comprise at least one fluid mixer, such as static mixer 37, to enhance mixing and distribution of the lighter specific gravity oil being injected such that the entire production water feed stream being introduced into the vessel 10 has dispersed particles of the lighter oil in its entire cross section, thereby impacting or ensuring contact with the full cross sectional area of the coalescing mesh 30. Without being limited to theory, once lighter oil particles (e.g., having a specific gravity of approximately 0.6-0.8) adhere to the mesh 30, the particles join and mix with heavier oil particles in the feed stream (e.g., having a specific gravity of approximately 0.95 or greater), which also adhere to the mesh 30, thereby creating a mixture of light and heavy oil particles, resulting in an oil particle having a reduced overall specific gravity. As above, these oil particles having reduced specific gravity are swept through the coalescing mesh 30 and enter vessel 10.

As a result, the present system advantageously allows for the resultant specific gravity to be predetermined and controlled by the amount of light oil injected into the production water feed stream. As all lighter oil specific gravity particles are of particular (sufficient) size, they will adhere to the coalescing mesh 30 and dilute the heavy oil particles clinging to the same coalescing mesh 30. Thus, the amount of dilution desired (i.e., specific gravity of the mixture) can be controlled by regulating the amount of lighter oil injected through injection port 38 and corresponding nozzle 39 in comparison to the amount of heavy oil produced in the inlet water stream. By way of example, and without limitation, a quantity of 0.95 specific gravity oil mixed with an equal quantity of 0.7 specific gravity oil will result in two times the quantity of oil with an overall reduced specific gravity of 0.825.

According embodiments herein, and by way of non-limiting example, it is contemplated that the present apparatus and methodologies may be used alone or in conjunction with an existing system of tanks or surface equipment for separating and measuring oil, gas and water (e.g., an existing oil battery). In this regard, the present apparatus and methodologies may be used to improve the performance, safety and reliability of existing oil batteries, or such facilities may be retrofitted and/or replaced therewith. Where desirable, the existing oil field battery may be modified such that the water injection plant and/or filtering skid is retrofitted or replaced to first accommodate polymer injection, and then to accommodate the increased water injection capacities of the present system (up to at least ~6500 $m^3/d$).

In some cases, one or more of supplementary fluid vessels 10 may further be added to the system, the additional vessels 10 as described herein, where one or more of the vessels 10 may comprise a skim tank and one or more of the vessels 10 may comprise an injection tank. As would be known, in addition to the additional vessels 10, any and all corresponding system componentry, tie-ins or ancillary equipment necessary to accommodate the vessels 10 would be included such as, for example, a potential vapour recovery unit (VRU), a flare system, and/or oil emulsion heating equipment. In addition to the present capacity assessments, it would be understood that a review of the battery's heat transfer or other systems may be performed, in order to mitigate any potential issues, including the possibility of polymer returns in future production fluids caking onto fire tubes. It would be understood that the at least one additional fluid vessels 10 may be sized and configured to be operative with the existing oil field battery, and also to compensate for a pump failure or a shutdown of the existing system, providing additional time to address or to troubleshoot a system failure (or potentially to arrange for a back-up truck service, if required).

It is contemplated that the one or more supplemental fluid vessels 10 may be distinct or continuous in operation with the existing system. As would be understood, the fluid levels within the tanks may be maintained by one or more control valves or pumps. Optionally, and where necessary, source water may be added directly to the injection tank in order to compensate for any shortfall of required water for polymer makeup or voidage in the reservoir.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and the described portions thereof.

What is claimed is:

1. A method for separating production water arising from at least one primary separation process following oil well production operations, the production water having at least a water phase and an oil phase between 100 to 10,000 PPM oil-in-water, the method comprising:
   receiving the production water in at least one gravity separation vessel having at least one first fluid tank concentrically nested within at least one second fluid tank, the first and second fluid tanks each having a height, wherein receiving the production water comprises
      introducing the received production water to the first fluid tank along the entire height of the first fluid tank, and
      directing fluid flow along a first fluid flow path within the first fluid tank at a flow rate of approximately one foot per minute,
   recovering the separated oil phase from the at least one first fluid tank and directing the separated water phase, via at least one fluid conduit, to the at least one second fluid tank, receiving the separated water phase from the first fluid tank in the second fluid tank, wherein receiving the separated water phase comprises
      introducing the separated water phase to the second fluid tank along the entire height of the second fluid tank, and
      directing fluid flow along a second fluid flow path within the second fluid tank at a flow rate of approximately one foot per minute, and
   recovering the separated oil phase from the at least one second fluid tank, and
   recovering the resulting separated water phase from the at least one second fluid tank, wherein the resulting separated water phase contains less than approximately 50 PPM oil-in-water.

2. The method of claim 1, wherein the oil phase comprises heavy oil having a specific gravity of at least approximately 0.90-0.95.

3. The method of claim 2, wherein the method further comprises injecting lighter oil into the production water to reduce the specific gravity of the heavy oil to at least approximately 0.75-0.85.

4. The method of claim 3, wherein the method further comprises providing a mixer for increasing distribution of lighter oil injected into the production water.

5. The method of claim 1, wherein the oil phase comprises oil particles averaging approximately 10-40 microns in size.

6. The method of claim 5, wherein the method further comprises providing a coalescing medium and exposing the production water to the coalescing medium to increase the average oil particle size to approximately at least 100 microns in size.

7. The method of claim 1, wherein the production water is received in the at least one separation vessel at a flow rate of at least between approximately 3500 $m^3$ per day to approximately 6500 $m^3$ per day.

8. The method of claim 1, wherein the resulting separated water may be re-used in the oil well production operation.

9. An apparatus for continuously separating production water containing an oil-in-water emulsion, the production water stemming from at least one primary separation process following oil well production operations, the production water having at least an oil phase and water phase between 100 to 10,000 PPM oil-in-water, the apparatus comprising:
   at least one first fluid tank having at least one first tank inlet for receiving the production water from the at least one primary separation process, and at least one first tank outlet for expelling the oil phase separated from the water phase in the first fluid tank,
   at least one second fluid tank in fluid communication with the first fluid tank, the second fluid tank having at least one second tank inlet for receiving the water phase from the at least one first fluid tank, and at least two second tank outlets for expelling the oil phase separated from the water phase and the resulting clean water from the second tank, and
   at least one fluid conduit providing fluid communication between the first and second fluid tanks, and for directing the water phase from at or near a bottom end of the first fluid tank to the second fluid tank at or near an upper end of the second fluid tank,
   wherein both the at least one first tank inlet and the at least one fluid conduit are configured to:
      introduce the production water along substantially an entire height of the first and second fluid tanks, respectively; and
      controllably regulate the flow of the production water through the first and second fluid tanks at a rate of one foot per minute, respectively.

10. The apparatus of claim 9, wherein the at least one first fluid tank is concentrically nested within the at least one second fluid tank.

11. The apparatus of claim 10, wherein one or both of the first and second fluid tanks may comprise an interior baffle for directing fluid flow within the tanks, the interior baffle of the first fluid tank extending substantially across a cross-section of the first fluid tank and the interior baffle of the second fluid tank extending across an annulus formed between the first fluid tank and the second fluid tank.

12. The apparatus of claim 9, wherein the at least one first tank outlet comprises skimmers for recovering the oil from the surface of the water phase.

13. The apparatus of claim 9, wherein the at least one second fluid tank outlet comprises skimmers for recovering the oil from the surface of the water phase.

14. The apparatus of claim 9, wherein the at least one first fluid tank is substantially cylindrical and comprises a height of at least approximately 22 feet and an inner diameter of at least approximately 12 feet across.

15. The apparatus of claim 9, wherein the at least one second fluid tank is substantially cylindrical and comprises a height of at least approximately 26 feet and an inner diameter of at least approximately 24 feet across.

16. The apparatus of claim 9, wherein the apparatus may further comprise at least one coalescing medium positioned in-line with and upstream of the first tank inlet.

17. The apparatus of claim 9, wherein the apparatus may further comprise at least one gas injection port in communication with and upstream of the first tank inlet.

18. The apparatus of claim 9, wherein the apparatus may further comprise a mixer positioned in-line with and upstream of the first tank inlet.

19. The apparatus of claim 9, wherein the overall fluid volume of the apparatus may comprise at least approximately 300-350 $m^3$.

* * * * *